United States Patent [19]
Ullmann et al.

[11] 3,928,163
[45] Dec. 23, 1975

[54] SPARK DISCHARGE AND ELECTRO-CHEMICAL EROSION MACHINING APPARATUS

[75] Inventors: Werner Ullmann, Locarno; Bernd Schumacher, Losone; Silvano Mattei, Locarno-Solduno; Hans-Ueli Fenner, Ascona; Arno Sieg, Locarno, all of Switzerland

[73] Assignee: A.G. fur industrielle Elektronik AGIE Losone b. Locarno, Losone, Switzerland

[22] Filed: Apr. 23, 1974

[21] Appl. No.: 463,317

[30] Foreign Application Priority Data
Sept. 11, 1973 Switzerland.................... 13062/73

[52] U.S. Cl............. 204/206; 204/224 M; 204/237; 219/69 D; 219/69 V
[51] Int. Cl.²......................... B23P 1/04; B23P 1/08
[58] Field of Search ............. 204/224 M, 286–288, 204/225, 284, 206, 129.2, 129.5, 129.6, 204/237–239; 219/69 E, 69 R, 69 D, 69 V

[56] References Cited
UNITED STATES PATENTS

| | | | |
|---|---|---|---|
| 3,417,006 | 12/1968 | Inoue............................... | 204/129.2 |
| 3,642,601 | 2/1972 | Kondo ............................ | 204/225 X |
| 3,696,014 | 10/1972 | Goodard et al................ | 204/225 X |
| 3,719,579 | 3/1973 | Cross et al. ......................... | 204/286 |
| 3,801,489 | 4/1974 | Samson ....................... | 204/224 M X |
| 3,803,015 | 4/1974 | Andrews............................ | 204/286 |

FOREIGN PATENTS OR APPLICATIONS

45-12967    5/1970    Japan.............................. 204/129.6

Primary Examiner—G. L. Kaplan
Attorney, Agent, or Firm—William R. Woodward

[57] ABSTRACT

In electro-erosion machining using a filamentary erosion electrode, a dielectric flushing medium (for spark-discharge erosion) or an electrolyte fluid (for electrochemical erosion) is fed from an outlet to the working area of the electrode in the direction of the electrode axis and in contact with it so as to cool the electrode and to reduce changes in the machining characteristics with changes in cutting direction. A continuously operable regenerating system, including deionising apparatus which is brought into, and out of, operation under the control of a conductivity measuring device, is provided for regenerating the used dielectric flushing medium in spark-discharge erosion machining.

16 Claims, 7 Drawing Figures

SPARK DISCHARGE AND ELECTRO-CHEMICAL EROSION MACHINING APPARATUS

SUMMARY OF THE INVENTION

This invention relates to spark-discharge and electro-chemical erosion machining of electrically conductive materials.

In spark-discharge or electrochemical machining, material is eroded from a workpiece under the effect of an electrical discharge between a tool electrode and the workpiece which is made a counter-electrode. Such machining has become conventional for producing holes in workpieces which is known as electro-erosion "drilling." Recent years have seen the development of spark-discharge or electrochemical cutting using a moving, path-controlled tool electrode. In this case, the tool electrode consists of electrically conductive elongate material, i.e. wire, band or strip material, which is stretched out between two guides arranged on either side of the workpiece. Such an electrode will be referred to herein as a "filamentary" electrode.

Considerably more material is eroded from the workpiece than from the electrode but some material may be eroded from the electrode. Therefore, in order to maintain the geometric accuracy of the cut, the electrode is drawn through the working zone slowly or relatively quickly, depending upon its degree of wear. Usually, a servo system is provided for a relative movement, defining the cutting path, between the workpiece and electrode, so that, despite erosion of the workpiece, the distance between the electrode and the workpiece remains constant. This constant distance is known as a constant working gap.

For electro-chemical machining an electrolyte medium is supplied to the working gap, while, for spark-discharge machining, a dielectric flushing medium is supplied in order to increase the efficiency of erosion. It is known to supply the electrolyte or flushing medium by immersing the workpiece in a liquid medium or by directing one or more jets of a liquid medium towards the gap. A dielectric hydrocarbon can be used as the liquid flushing medium for the spark discharge machining as in the conventional spark-discharge drilling process. For cutting using a filamentary electrode however, it has proved to be of greater advantage to use deionised water, because it is then possible to obtain a greater cutting capacity and a better surface finish for the same discharge energy.

Unfortunately, the disadvantage of deionised water is that it immediately increases its conductivity and changes when it is contaminated by the products of erosion, when it comes into contact with dust from the air or when it is mixed with air itself. This results in changes in the cutting width and in the cutting capacity of the installation which in turn seriously restricts the working tolerances. If the flushing medium is introduced to the working gap by immersing the workpiece in a bath of the medium, the above-mentioned disadvantages of deionised water as the flushing medium have to be accepted because it is difficult in one and the same bath to follow and to control the degree of contamination and conductivity of the water accurately both in regard to time and in regard to location. Attempts to remedy this situation by avoiding the bath and flushing the working zone from the side with one or more jets and filtering the contaminated water flowing off from the working zone through a filter mat, have also proved to be unsatisfactory. Although, in this way, the conductivity of the water varies somewhat more slowly as a function of time, the dimensional accuracy of the erosive cuts is adversely affected by the irregular, lateral flushing operation with the result that the cut profiles bulge out to a greater or lesser extent, depending upon the direction in which the cutting direction extends in relation to the direction in which the jets of flushing medium are directed.

The possibility of continuously introducing freshly deionised water to the working zone and subsequently allowing it to run off as effluent is not of particular interest because it is expensive in terms of operating costs and unsatisfactory in terms of the result it produces.

According to one aspect of the invention there is provided electrode guide and fluid outlet means for an electro-erosion machine tool, comprising portions forming a guide for receiving a filamentary erosion electrode (21) and guiding movement of the electrode in the direction of the electrode axis, and portions defining an outlet for passing a fluid medium to a working area of the electrode to assist the erosion of a workpiece with said electrode, and so that the said fluid medium will be directed from the outlet to said working area along the axis of the electrode and in contact with the electrode.

According to a second aspect of the invention, there is provided a spark-discharge erosion machine tool comprising supporting and guiding means (1) for supporting and guiding movement of a filamentary erosion electrode (2), fluid outlet means (4) which is positioned near the supporting and guiding means and which comprises portions defining an outlet for passing a dielectric flushing medium to a working area of said electrode to assist erosion thereby, collecting means (5 and 6) positioned and constructed for collecting used flushing medium passing from said working area, and a regeneration system which is constructed and arranged for receiving said used flushing medium from said collecting means, for regenerating it and for returning it to said fluid outlet means, the regeneration system including conductivity determining means (12) operably connected for determining the conductivity of said used flushing medium, and deionising means (14) which is connected for being brought into operation to deionise said used flushing medium under the control of said conductivity determining means when the conductivity of the used flushing medium rises above a predetermined level.

According to a third aspect of the invention there is provided an electro-erosion machine tool comprising first and second spaced support members (17 and 18), and first and second electrode guide and fluid outlet means attached to respective ones of the support members, each said means comprising portions forming a guide for receiving a filamentary erosion electrode (21) and guiding movement of the electrode in the direction of the electrode axis, and portions defining an outlet for passing a fluid medium to a working area of the electrode between the spaced support members and so that the fluid medium will be directed from said outlet to said working area along the axis of said electrode and in contact with the electrode.

One advantage of an apparatus described herein with reference to the drawings is that filtered water with a certain degree of deionisation is continuously available. The reason why this advantage is significant is that the optimum conductivity of the deionised water is not always the lowest possible value. The behaviour of the important parameters, such as cutting width, cutting capacity and the coating of the workpiece with the electrode material, have to be determined in dependence upon conductance of the water for a given pairing of materials. Only after this behaviour has been determined is it possible to determine the optimum degree of deionisation at which the cut surface of the workpiece does not become coated with electrode material due to inadequate conductivity, nor is the cutting width varied, nor are there excessive losses of cutting capacity.

An advantage of other apparatus described herein with reference to the drawings, which apparatus has applications for both electrochemical erosion and spark discharge erosion machining, is that, since the working zone is flushed coaxially of the wire, it is regularly flooded for each cutting direction, irrespective of the geometry of the contour. This results in constant flushing conditions which provide for permanent, maximum electrical loading of the electrode and, hence, for permanent, maximum cutting capacity. In addition, the absence of transverse components from the jet directed coaxially along the electrode means that less vibration is generated in the electrode, which provides for improved linearity of the cut surface and better dimensional tolerance.

DESCRIPTION OF THE DRAWINGS:

For a better understanding of the invention and to show how the same may be carried into effect, reference will now be made, by way of example, to the accompanying drawings, in which:-

FIG. 4 is a cross-section through the electrode guide and fluid outlet means of FIG. 3a.

DETAILED DESCRIPTION

Figure 1A:
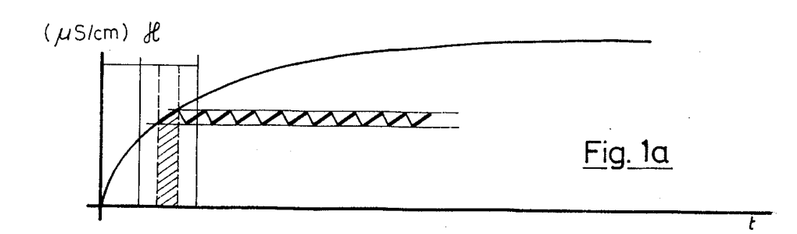
FIGS. 1a, 1b, 1c are curves showing relationships between conductance of the flushing medium, working time, cutting capacity and cutting width in a spark-discharge machining operation.
Figure 1B:
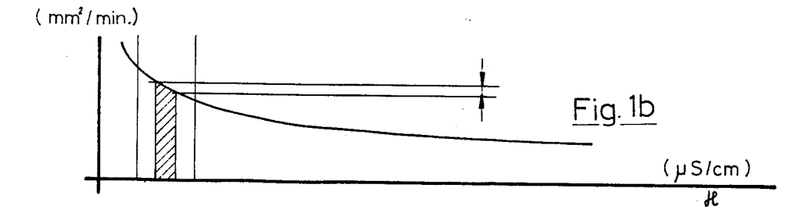
Figure 1C:
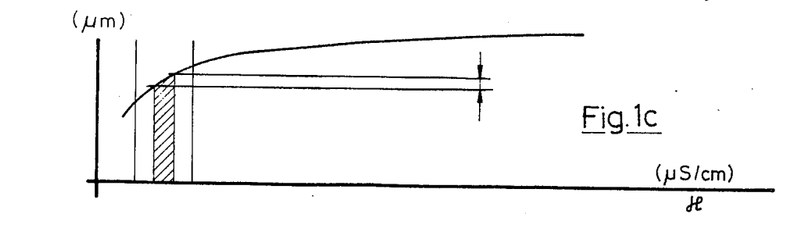

The significance of the conductivity $k$ of the flushing medium is illustrated in FIG. 1a as a function of the working time $t$. In FIG. 1a, the conductivity $k$ of the water is plotted in $\mu S/cm$ on the ordinate and the working time $t$ on the abscissa. At time $t = 0$, i.e. before commencement of the spark-discharge or electrochemical machining operation, the deionised water can have conductivity values $k$ of from 0.1 to about 2 $\mu S/cm$. With the commencement of machining, the conductance $k$ increases, at first rapidly and then more and more slowly as it approaches saturation level. The consequences of the changes in conductance is shown in FIGS. 1b and 1c. FIG. 1b shows the change in cutting capacity in $mm^2/min$ (ordinate) as a function of the conductance $k$ in $\mu S/cm$ recorded on the abscissa. FIG. 1c shows the change in cutting width $\mu m$ on the ordinate as a function of the conductance $k$ recorded on the abscissa. Whereas cutting capacity decreases, cutting width increases with increasing conductance $k$.

It should be noted that, at extremely low conductances, where the cutting capacity is at its greatest, the cut surface of the workpiece, especially if the cut surface is intricately curved, becomes coated with material from the filamentary electrode within a very wide energy range of the erosion discharge impulses. In cases where copper is used as the material for the electrode, a layer of copper several hundredths to tenths of a millimetre in thickness can be formed and has to be subsequently removed by chemical dissolution. It follows from this that, for optimum work, the conductance of the water has to be selected at a favourable level, i.e. not so low that it could give rise to coating of the workpiece, but at the same time not too high because, otherwise, unnecessary losses in cutting capacity would occur. This level has to be experimentally determined for any given pairing of materials.

Accordingly, the conductivity level $k$ once adjusted, has to be maintained within narrow tolerances, for example $\pm 1 \mu S/cm$, to ensure that no measurable changes occur in the cutting width.

This principle is illustrated in FIGS. 1a, 1b and 1c.

Figure 2:
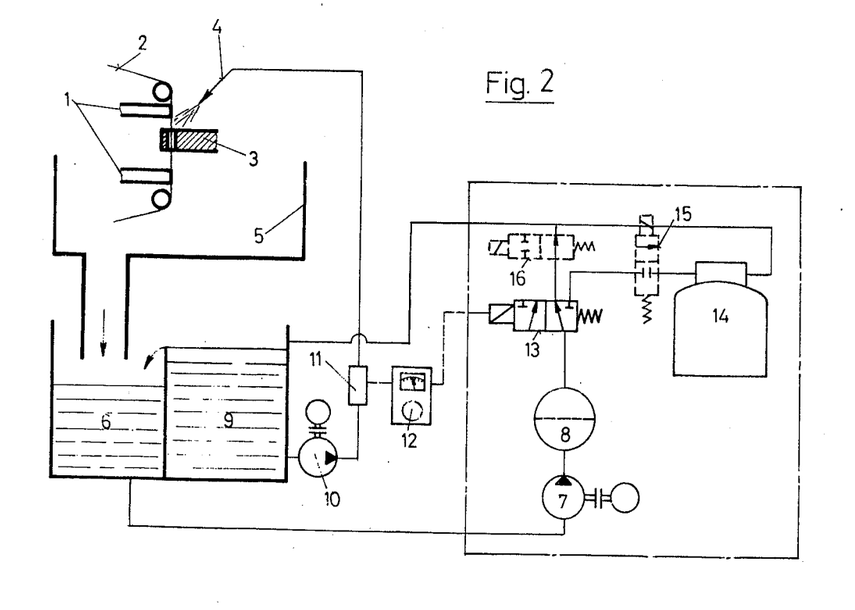
FIG. 2 is a diagrammatic illustration of a flushing medium regenerating system.

However, a system for checking and treating the water is required for this purpose. FIG. 2 diagrammatically illustrates one embodiment of such a system. The arms 1, on which the guides for the moving wire electrode 2 are mounted, are diagrammatically illustrated in longitudinal section. Workpiece 3 is clamped in between. The liquid flushing medium is introduced laterally into the working zone in the form of a jet 4. The water flowing off from the working zone is collected in a container 5 and delivered through an outlet to a dirty-water tank 6. The water, contaminated by the eroded particles and partly reionised, is delivered by a pump 7 through a filter 8 to a clean-water tank 9. The water freed from dirt particles is removed from this clean-water tank 9 by means of a pump 10 and is delivered in the form of one or more jets 4 for flushing the working zone. Accordingly, a conductivity measuring cell 11, connected to a conductance tester 12, continuously checks the water to determine whether the conductance $k$ is within the range adjusted in the conductance tester 12. If the conductivity undergoes an excessive increase, taking it out of the required range, the electrical two-position three-way valve 13 is actuated so that the water from the dirty-water tank 6 is delivered by the pump 7 not only through the filter 8, but also through the deionising cartridge 14 and thereafter to the clean-water tank 9. As is known, cartridge type deionizers provide a synthetic resin over which the water flows and which separates the positive and negative ions from the water. After a time such a synthetic resin becomes inactive, i.e. less effective in deionizing the water, and that is why such resins are provided in cartridge form. Of course other known deionizing means may be used instead. In this way, the conductance of the water in the clean-water tank 9 is gradually reduced, as shown in FIG. 1a, until the lower limit of the level adjusted in the conductance tester 12 is reached. The conductance tester 12 then switches the valve 13 back to the filtration cycle.

The circuit can of course be designed in such a way that, instead of having one two-position three-way valve 13, it incorporates two one-way electric valves 15 and 16 which are controlled by the conductance tester 12 in such a way that, when the upper conductance limit is reached, the valve 15 opens and the valve 16 closes until the lower conductance threshold (filter and deionisation cycle) is reached. The valve 15 then closes whilst the valve 16 opens (filter cycle).

Figure 3:
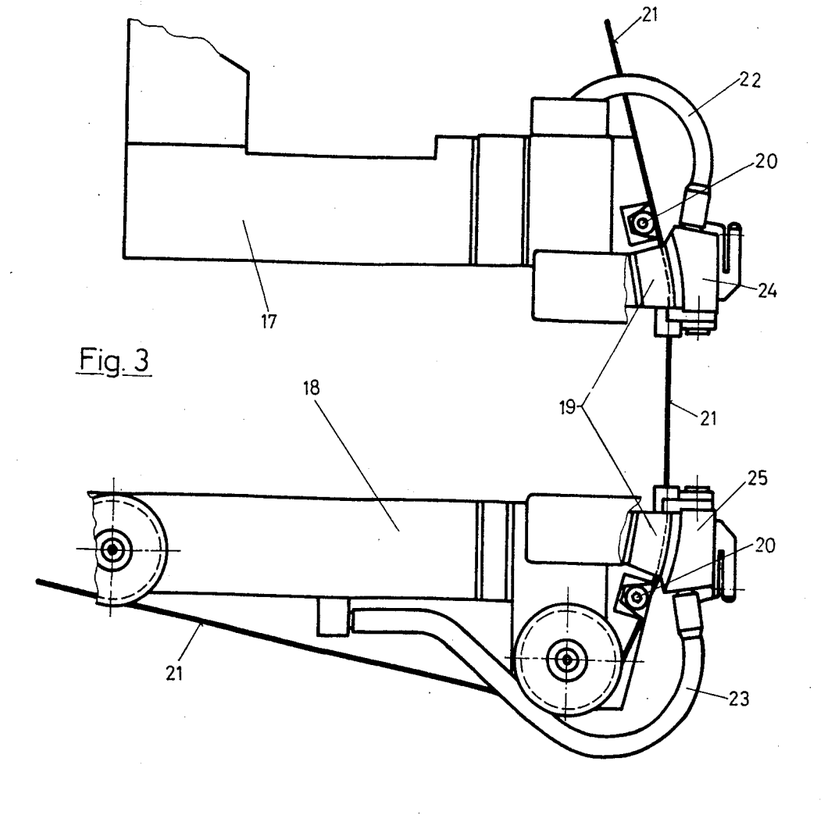
FIG. 3 is a view of part of an electroerosion machine tool and shows two electrode guide and fluid outlet means.

FIG. 3 shows one embodiment of the wire-guide arms of a wire erosion cutting installation. The reference 17 denotes the upper arm and the reference 18 the lower arm to which are attached the notched wire-guide members 19 made of sapphire and the elements 20 carrying current to the wire 21. The workpiece 3 to be machined is clamped between the arms. The filtered, deionised water kept to a favourable conductance level is brought in through the pipes 22 and 23 and the two fluid outlet members 24 and 25 around the wire 21 so that the working zone can be flushed from above and- /or from below.

Figure 4:
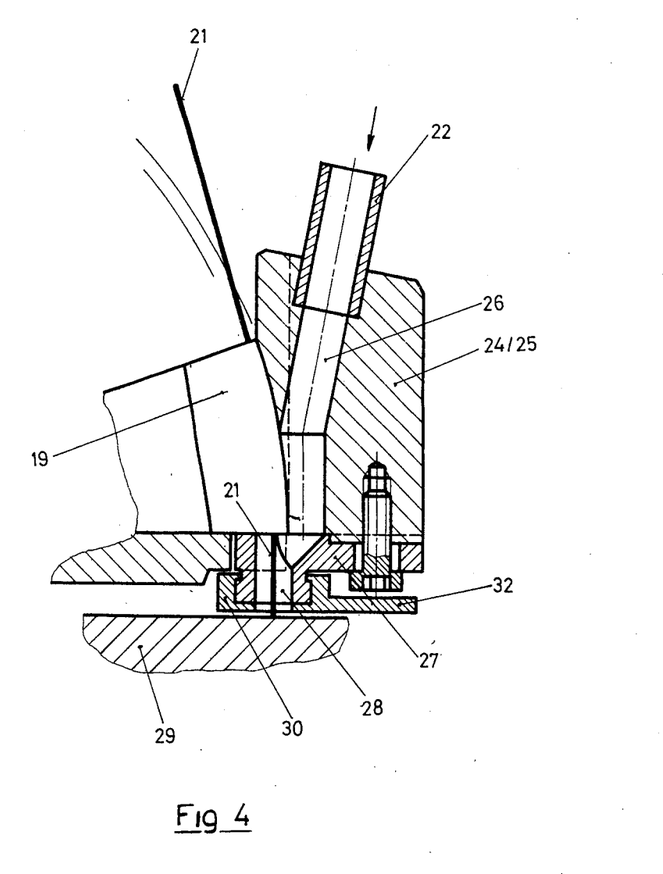

The internal construction of the members 24 and 25 can be seen from FIG. 4. These members rest very firmly against the notched sapphire wire guides 19. The flushing liquid is delivered through the pipe 22 into a bore 26 which, with its flow-promoting configuration (tapering cross section), carries the water along the lower half of the sapphire guide so that the wire heated by the machining operation can be cooled over a greater length. For this reason, the wire is able to withstand heavier current loads without any danger of cracking. At the outlet end of the wire guide, the jet of water is deflected by the extension 27 in such a way that the wire is completely flushed with water. The last part of the bore 28 ensures that the jet of water stabilises before issuing from the flushing nozzle coaxially of the wire. If required, the coaxial flushing nozzle can be brought up to the workpiece by adjusting the arms, so that the flushing effect is intensified and the flushing conditions in the working zone more effectively controlled.

Figure 3A:
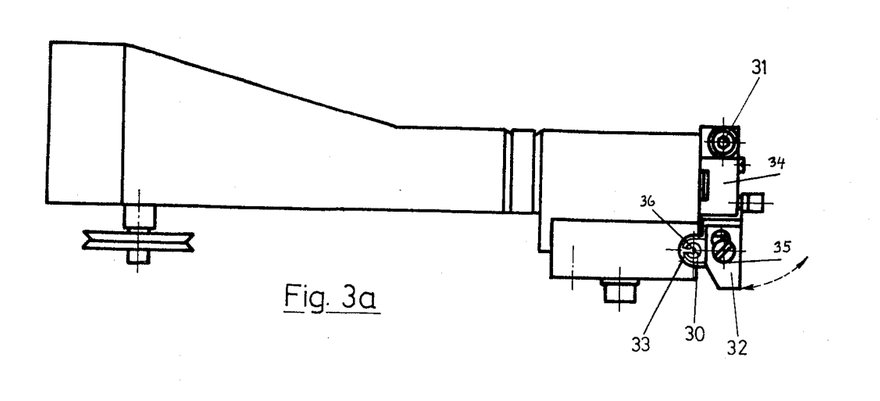
FIG. 3a is a plan view of the upper support arm and the electrode guide and fluid outlet means shown in FIG. 3.

FIG. 3a is a plan view of the coaxial flushing system illustrated in FIG. 3. When setting up the machine tool, the wire electrode 21 is introduced into the wire guide member 19, the current-transmission member 20, and the member 24.

To enable this to be done more easily, the member 24 of the upper wire guide arm 17 according to FIG. 3a is pivotable, in the arrowed direction about the axis 31 of a pivot mounting by which a body part 34 of the member 24 is mounted on the upper wire guide arm 17. The nozzle part, i.e. the part which defines the duct part 28, of the member 24 has on it a flanged collar or cover member 30 which is formed with a lever 32. The collar member 30 can be turned on the nozzle part by means of the lever 32 to two positions defined by abutment screw 35 co-operating with the two ends of an elongated hole in the lever 32. In each of the nozzle part and the collar 30 is an opening in the form of a longitudinal slot 33 and 36. The slots 33 and 36 extend parallel to the axis of the electrode 21 and, when the lever 32 is in the position shown in FIG. 3a, the slots are aligned one with the other. When the two slots 33 and 36 are aligned, the wire electrode 21 (FIGS. 3a and 4) can pass into the duct 28 and thus allow the member 24 to be pivoted to or away from the guide 19 when the electrode is present in the guide. To set up the machine tool, the two slots 33 and 36 are aligned with one another and then the member 24 is pivoted away from the guide 19 and the current transmission member 20. The electrode 21 can then be introduced into the guide 19 and the current-transmission element 20. The member 24 is then pivoted about the axis 31 back towards the guide 19 and the current-transmission element 20 so that the electrode 21 enters the duct 28 of the member 24 through the two slots 33 and 36. The lever 32 is then used to turn the collar 30 so that the slot 33 is displaced relative to the inner slot 36 and this inner slot is hence closed off and, during the subsequent spark discharge or electrochemical machining operation, the flushing medium passing through the duct 28 is unable to escape through it. The member 25 is exactly similar to the member 24 except that it is positioned "upside down" in relation to the member 24 so that flushing medium or electrolyte coming from it is directed upwards along the electrode 21.

With the electrode fixed in position on both the arms 17 and 18, the spark-discharge or electrochemical machining operation can begin. On completion of the machining operation, the members 24 and 25 can be pivoted away from the guide members 19 and current-transmission members 20 after moving the lever 32 so that the two slots 33 and 36 are brought into line with one another and hence allowing the electrode to emerge from the ducts 28.

The collar 30 and the nozzle part defining the duct 28 can consist of an electrically non-conductive material. The members 24 and 25 can then be brought closer up to the workpiece 3.

The guide and fluid outlet means described above can be used for both spark-discharge machining and electrochemical machining of workpieces by means of a wire or band electrode.

In the arrangement shown in FIG. 3, it will be seen that two fluid outlet members 24 and 25 are provided in association with respective ones of the guides 19. It will be understood that one of the fluid outlet members may be able to be discarded in cases where sufficient flushing can be performed with the other.

We claim:

1. An electro-erosion machine tool comprising a filamentary erosion electrode (21) and electrode guide and fluid delivery means, said electrode guide and fluid delivery means comprising a portion forming a guide for receiving said filamentary erosion electrode (21) and guiding movement of the electrode in the direction of the electrode axis, a portion defining an outlet for discharging a fluid medium alongside of said electrode in contact with the outer surface thereof and parallel to the axis thereof towards a working area of said electrode, and a portion providing duct means for leading said fluid medium from a supply conduit to said outlet in such a way as to cause said fluid medium to be discharged through said outlet as aforesaid when supplied from said supply conduit.

2. An electro-erosion machine tool according to claim 1, comprising a guide member (19) which constitutes said portion forming said guide, a fluid handling member (24 or 25) which includes said portion defining said outlet and said portion providing said duct means, support means (17 or 18) for supporting the guide member and the fluid handling member, and a pivot mounting (31) by which one of the fluid handling member and guide member is mounted on the support member so as to be relatively movable away from the other to enable the electrode to be positioned in said guide.

3. An electro-erosion machine tool according to claim 2, wherein the guide member is fixedly mounted with respect to said support means and the fluid handling member is mounted on the support means by means of said pivot mounting.

4. An electro-erosion machine tool according to claim 3, wherein the fluid handling member comprises a nozzle part (27) which provides a duct portion (28) of said duct means for leading said fluid medium to said outlet and wherein said guide member is constructed for guiding the electrode so that it will pass through said duct portion and out of said outlet in co-axial relationship therewith, said nozzle part having an opening formed therein for allowing the fluid handling member to be moved so that the electrode passes out of the opening and hence enabling the fluid handling member to be pivoted away from the guide member and electrode, the fluid handling member further comprising means (30) for closing said opening when a machining operation utilizing the electrode is to take place.

5. An electro-erosion machine tool according to claim 4, wherein said closing means comprises a collar member (30) mounted on the said nozzle part so as to be turnable with respect thereto, said collar member having an opening formed therein, which opening can be aligned with the opening in said nozzle part by turning the collar member to a defined position in relation to the nozzle part.

6. An electro-erosion machine tool according to claim 5, wherein the collar member comprises a lever portion (32) by which it may be turned, and abutment means (35) for defining said position in which the said openings are aligned.

7. An electro-erosion machine tool according to claim 1, in which said guide forming portion is positioned so as to guide the electrode so that it will pass through an exit portion (28) of said duct means adjoining said outlet and thereafter pass out of the said discharge outlet in co-axial relationship with said exit portion (28) of said duct means.

8. An electro-erosion machine tool according to claim 7, in which said portion providing duct means defines a further duct portion (26) for leading said fluid medium to the said exit portion of said duct means, the further duct portion (26) being such as to lead the fluid medium past the guide forming portions so that, in use, the fluid medium will contact a length of the electrode which is in said guide and thereby cool the electrode.

9. An electro-erosion machine tool according to claim 1, wherein a guide member is spaced from said electrode guide and fluid delivery means to define therewith and there between a working length of the electrode, said guide member comprising portions forming a guide for receiving said filamentary erosion electrode and guiding said movement of the electrode in the direction of the electrode axis.

10. A spark-discharge erosion machine tool comprising supporting and guiding means (1) for supporting and guiding movement of a filamentary erosion electrode (2), fluid delivery means (4) which is positioned near the supporting and guiding means and which comprises portions defining an outlet for passing a dielectric flushing medium to a working area of said electrode to assist erosion thereby, collecting means (5 and 6) positioned and constructed for collecting used flushing medium passing from said working area, and a regeneration system which is constructed and arranged for receiving said used flushing medium from said collecting means, for regenerating it and for returning it to said fluid outlet means, the regeneration system including conductivity determining means (12) operably connected for determining the conductivity of said used flushing medium, and deionising means (14) which is connected for being brought into operation to deionise said used flushing medium under the control of said conductivity determining means when the conductivity of the used flushing medium rises above a predetermined level.

11. A spark-discharge erosion machine tool according to claim 10, wherein said collecting means comprises a container (5), said supporting and guiding means being at least partly positioned within the container for erosion to be performed therein and said container comprising portions defining a drain outlet for the used flushing medium, and a tank (6) positioned for receiving the used flushing medium which drains from said container via said drain outlet.

12. A spark-discharge erosion machine tool according to claim 10, wherein said regenerating system comprises a first pump (7) connected to said collecting means for receiving used flushing medium collected thereby, filter means (8) connected to the downstream side of the pump for filtering the used flushing medium pumped thereby, a tank (9) connected to receive the filtered used flushing medium from said filter means, and a second pump connected for pumping flushing medium from the tank to said fluid outlet means.

13. A spark-discharge erosion machine tool according to claim 10, including valve means (13 or 15 and 16) connected into the regeneration system and to be controlled by the conductivity determining means for diverting the used flushing medium to said deionising means.

14. A spark-discharge erosion machine tool according to claim 10, wherein said conductivity determining means is operable to bring said deionising means out of operation when the conductivity of the used flushing medium falls to a second predetermined level which is lower than the first-mentioned predetermined level.

15. A spark discharge erosion machine tool according to claim 10, wherein said deionizing means is of the cartridge type.

16. An electro-erosion machine tool comprising first and second spaced support members (17 and 18), and first and second electrode guide and fluid delivery means attached to respective ones of the support members, each said means comprising portions forming a guide for receiving a filamentary erosion electrode (21) and guiding movement of the electrode in the direction of the electrode axis, and portions defining an outlet surrounding said electrode for passing a fluid medium to a working area of the electrode between the spaced support members and such that the fluid medium will be directed from said outlet to said working area along the axis of said electrode and in contact with the electrode.

* * * * *

REEXAMINATION CERTIFICATE (411th)

United States Patent [19]

Ullmann et al.

[11] B1 3,928,163

[45] Certificate Issued Nov. 5, 1985

[54] SPARK DISCHARGE AND ELECTRO-CHEMICAL EROSION MACHINING APPARATUS

[75] Inventors: Werner Ullmann, Locarno; Bernd Schumacher, Losone; Silvano Mattei, Locarno-Solduno; Hans-Ueli Fenner, Ascona; Arno Sieg, Locarno, all of Switzerland

[73] Assignee: A.G. fur industrielle Elektronik AGIE Losone b. Locarno, Losone, Switzerland Reexamination Request:
No. 90/000,629, Sep. 17, 1984

Reexamination Certificate for:
Patent No.: 3,928,163
Issued: Dec. 23, 1975
Appl. No.: 463,317
Filed: Apr. 23, 1974

[30] Foreign Application Priority Data

Sep. 11, 1973 [CH] Switzerland ............... 13062/73

[51] Int. Cl.$^4$ .................. B23P 1/04; B23P 1/08
[52] U.S. Cl. ................... 204/206; 204/224 M; 204/237; 219/69 D; 219/69 V
[58] Field of Search ............ 204/224 M, 286–288, 204/225, 284, 206, 129.2, 129.5, 129.6, 237–239; 219/69 R, 69 E, 69 D, 69 V

[56] References Cited

U.S. PATENT DOCUMENTS

| 2,792,343 | 5/1957 | Vogler et al. | 210/25 |
|---|---|---|---|
| 2,827,427 | 3/1953 | Barry et al. | 204/129.5 |
| 3,018,975 | 1/1962 | Kulicke, Jr. | 242/54 R |
| 3,371,022 | 2/1968 | Inoue | 204/143 |
| 3,381,869 | 5/1968 | Smith | 226/97 |
| 3,417,006 | 12/1968 | Inoue | 204/129.2 |
| 3,493,710 | 2/1970 | Moore | 219/69 V |
| 3,532,852 | 10/1970 | Larson | 219/103 |
| 3,553,423 | 1/1971 | Doxey | 219/137.7 |
| 3,642,601 | 2/1972 | Kondo | 204/206 |
| 3,645,431 | 2/1972 | Harrison | 226/97 |
| 3,654,114 | 4/1972 | Brandstaetter | 204/206 |
| 3,669,328 | 6/1972 | Castelli | 226/97 |
| 3,696,014 | 10/1972 | Goodard et al. | 204/129.1 |
| 3,698,612 | 10/1972 | Brock | 226/91 |
| 3,706,407 | 12/1972 | King et al. | 226/97 |
| 3,713,572 | 1/1973 | Goldsworthy et al. | 226/7 |
| 3,719,579 | 3/1973 | Cross et al. | 204/286 |
| 3,801,489 | 4/1974 | Samson | 204/284 |
| 3,803,015 | 4/1974 | Andrews | 204/224 M |

FOREIGN PATENT DOCUMENTS

| 265459 | 1/1968 | Australia . |
|---|---|---|
| 38-14649 | 8/1963 | Japan . |
| 41-12849 | 7/1966 | Japan ............... 204/224 M |
| 526365 | 9/1972 | Switzerland . |
| 1081901 | 9/1957 | United Kingdom . |
| 91792 | 12/1949 | U.S.S.R. . |
| 234084 | 12/1968 | U.S.S.R. . |
| 299326 | 3/1971 | U.S.S.R. . |

OTHER PUBLICATIONS

"American Machinist," Feb. 21, 1972, pp. 70–71, (McGraw-Hill).
"Technische Rundschau," No. 27; Jun. 20, 1969, pp. 30–33.
"Technische Rundschau," No. 13; Apr. 3, 1970, pp. 6–9.
"Electrochemical Machining of Materials," Scientific and Practical Journal, No. 4, 1965.
"Making Steel Blanking Dies by the Electrochemical Method," V. D. Proklova et al, pp. 205–211, 1970.
"Intricate-Shape Cutting-Out of Sheet Stock by an Electrochemical Method," V. D. Proklova et al, 1970.

Primary Examiner—G. L. Kaplan

[57] ABSTRACT

In electro-erosion machining using a filamentary erosion electrode, a dielectric flushing medium (for spark-discharge erosion) or an electrolyte fluid (for electro-chemical erosion) is fed from an outlet to the working area of the electrode in the direction of the electrode axis and in contact with it so as to cool the electrode and to reduce changes in the machining characteristics with changes in cutting direction. A continuously operable regenerating system, including deionising apparatus which is brought into, and out of, operation under the control of a conductivity measuring device, is provided for regenerating the used dielectric flushing medium in spark-discharge erosion machining.

B1 3,928,163

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-11 and 13-16 is confirmed.

Claim 12 is determined to be patentable as amended.

New claims 17-24 are added and determined to be patentable.

12. A spark-discharge erosion machine tool *comprising supporting and guiding means (1) for supporting and guiding movement of a filamentary erosion electrode (2), fluid delivery means (4) which is positioned near the supporting and guiding means and which comprises portions defining an outlet for passing a dielectric flushing medium to a working area of said electrode to assist erosion thereby, collecting means (5 and 6) positioned and constructed for collecting used flushing medium passing from said working area and a regeneration system which is constructed and arranged for receiving said used flushing medium from said collecting means for regenerating it and for returning it to said fluid outlet means, the regeneration system including conductivity determining means (12) operably connected for determining the conductivity of said used flushing medium, deionizing means (14) which is connected for being brought into operation to deionize said used flushing medium under the control of said conductivity determining means when the conductivity of the used flushing medium rises above a predetermined level,* [according to claim 10, wherein said regenerating system comprises] a first pump (7) connected to said collecting means for receiving used flushing medium collected thereby, filter means (8) connected to the downstream side of the pump for filtering the used flushing medium pumped thereby, a tank (9) connected to receive the filtered used flushing medium from said filter means, and a second pump connected for pumping flushing medium from the tank to said fluid outlet means.

*17. An electro-erosion machine tool comprising:*
*a filamentary wire erosion electrode;*
*electrode guide and flushing fluid delivery means, said electrode guide and flushing fluid delivery means comprising*
  *a portion forming a guide for receiving said filamentary wire erosion electrode and guiding movement of the electrode in the direction of the electrode axis,*
  *a portion defining an outlet for discharging a dielectric fluid flushing medium alongside of said wire electrode in contact with the outer surface thereof and parallel to the axis thereof towards a working area of said electrode, and*
  *a portion providing duct means for leading said fluid flushing medium from a supply conduit to said outlet in such a way as to cause said fluid flushing medium to be discharged through said outlet as aforesaid when supplied from said supply conduit;*
*collecting means positioned and constructed for collecting used flushing fluid medium passing from said working area; and*
*a regeneration system which is constructed and arranged for receiving said used flushing fluid medium from said collecting means, for regenerating it and for returning it to said outlet, the regeneration system including*
  *conductivity determining means operably connected for determining the conductivity of said used flushing fluid medium, and*
  *deionizing means which is connected for being brought into operation to deionize said used flushing fluid medium under the control of said conductivity determining means when the conductivity of the used flushing fluid medium rises above a predetermined level.*

*18. An electro-erosion machine tool comprising:*
*a filamentary wire erosion electrode;*
*first and second spaced apart electrode guide and flushing fluid delivery means and having there between a working area of said electrode, each of said electrode guide and flushing fluid delivery means comprising*
  *a portion forming a guide for receiving said filamentary wire erosion electrode and guiding movement of the electrode in the direction of the electrode axis,*
  *a portion defining an outlet for discharging a dielectric fluid flushing medium alongside of said wire electrode in contact with the outer surface thereof and parallel to the axis thereof towards said working area of said electrode, and*
  *a portion providing duct means for leading said fluid flushing medium from a supply conduit to said outlet in such a way as to cause said fluid flushing medium to be discharged through said outlet as aforesaid when supplied from said supply conduit;*
*collecting means positioned and constructed for collecting used flushing fluid medium passing from said working area; and*
*a regeneration system which is constructed and arranged for receiving said used flushing fluid medium from said collecting means, for regenerating it and for returning it to said duct means, the regeneration system including*
  *conductivity determining means operably connected for determining the conductivity of said used flushing fluid medium, and*
  *deionizing means which is connected for being brought into operation to deionize said used flushing fluid medium under the control of said conductivity determining means when the conductivity of the used flushing fluid medium rises above a predetermined level.*

*19. An electro-erosion machine tool comprising:*
*a filamentary wire erosion electrode;*
*electrode guide and flushing fluid delivery means, said electrode guide and flushing fluid delivery means comprising*
  *a portion forming a guide for receiving said filamentary wire erosion electrode and guiding movement of the electrode in the direction of the electrode axis,*
  *a portion defining an outlet for discharging a dielectric fluid medium alongside of said wire electrode in contact with the outer surface thereof and paral-* lel to the axis thereof towards a working area of said electrode, and a portion providing duct means for leading said fluid flushing medium from a supply conduit to said outlet in such a way as to cause said fluid flushing medium to be discharged through said outlet as aforesaid when supplied from said supply conduit;

collecting means positioned and constructed for collecting used flushing fluid medium passing from said working area; and a regeneration system which is constructed and arranged for receiving said used flushing fluid medium from said collecting means, for regenerating it and for returning it to said duct means, the regeneration system including a first pump connected to said collecting means for receiving used flushing medium collected thereby, filter means connected to the downstream side of the pump for filtering the used flushing medium pumped thereby, a tank connected to receive the filtered used flushing medium from said filter means, a second pump connected for pumping flushing medium from the tank to said duct means, conductivity determining means operably connected for determining the conductivity of said used flushing fluid medium, and deionizing means which is connected for being brought into operation to deionize said used flushing fluid medium under the control of said conductivity determining means when the conductivity of the used flushing fluid medium rises above a predetermined level.

20. An electro-erosion machine tool comprising a filamentary erosion electrode and electrode guide and fluid delivery means, said electrode guide and fluid delivery means comprising a portion forming a guide for receiving said filamentary erosion electrode and guiding movement of the electrode in the direction of the electrode axis, a portion defining an outlet for discharging a fluid medium in a jet which is alongside of said electrode in contact with the outer surface thereof and parallel to the axis thereof towards a working area of said electrode, and a portion providing duct means for leading said fluid medium from a supply conduit to said outlet in such a way as to cause said fluid medium to be discharged through said outlet as aforesaid when supplied from said supply conduit.

21. An electro-erosion machine tool comprising first and second spaced support members, and first and second electrode guide and fluid delivery means attached to respective ones of the support members, each said means comprising portions forming a guide for receiving a filamentary erosion electrode and guiding movement of the electrode in the direction of the electrode axis, and portions defining an outlet surrounding said electrode for passing a fluid medium to a working area of the electrode between the spaced support members such that the fluid medium will be directed in a jet from said outlet to said working area along the axis of said electrode and in contact with the electrode.

22. An electro-erosion machine tool comprising a filamentary erosion electrode and electrode guide and fluid delivery means, said electrode guide and fluid delivery means comprising a portion forming a guide for receiving said filamentary erosion electrode and guiding movement of the electrode in the direction of the electrode axis, a portion defining an outlet for discharging a fluid medium alongside of said electrode in contact with the outer surface thereof and parallel to the axis thereof towards a working area of said electrode, and a portion providing duct means for leading said fluid medium from a supply conduit to said outlet in such a way as to cause said fluid medium to be discharged through said outlet as aforesaid when supplied from said supply conduit, a portion of said guide being disposed intermediate said working area and at least a portion of said duct means.

23. An electro-erosion machine tool comprising first and second spaced support members, and first and second electrode guide and fluid delivery means attached to respective ones of the support members, each said means comprising portions forming a guide for receiving a filamentary erosion electrode and guiding movement of the electrode in the direction of the electrode axis, portions defining an outlet surrounding said electrode for passing a fluid medium to a working area of the electrode between the spaced support members such that the fluid medium will be directed from said outlet to said working area along the axis of said electrode and in contact with the electrode, and portions providing a duct for leading said fluid from a supply conduit to said outlet, a portion of said guide being disposed intermediate said working area and at least a portion of said duct.

24. An electro-erosion machine tool comprising a filamentary erosion electrode and electrode guide and fluid delivery means, said electrode guide and fluid delivery means comprising a portion forming a guide for receiving said filamentary erosion electrode and guiding movement of the electrode in the direction of the electrode axis, a portion defining an outlet for discharging a fluid medium alongside of said electrode in contact with the outer surface thereof and parallel to the axis thereof towards a working area of said electrode, and a portion providing duct means for leading said fluid medium from a supply conduit to said outlet in such a way as to cause said fluid medium to be discharged through said outlet as aforesaid when supplied from said supply conduit, said guide being at least partially disposed in said duct means so that said fluid medium is in contact with a portion of said guide.

* * * * *